(12) United States Patent
Hudson

(10) Patent No.: US 11,627,731 B1
(45) Date of Patent: Apr. 18, 2023

(54) ARTICULATED EXOSKELETON BAIT HOLDER/PROTECTOR AND HOOK DEVICE

(71) Applicant: Donald Hudson, Houston, TX (US)

(72) Inventor: Donald Hudson, Houston, TX (US)

( * ) Notice: Subject to any disclaimer, the term of this patent is extended or adjusted under 35 U.S.C. 154(b) by 0 days.

(21) Appl. No.: 17/960,791

(22) Filed: Oct. 5, 2022

(51) Int. Cl.
*A01K 83/06* (2006.01)
*A01K 85/01* (2006.01)
*A01K 85/00* (2006.01)

(52) U.S. Cl.
CPC .......... *A01K 83/061* (2022.02); *A01K 85/012* (2022.02); *A01K 85/018* (2022.02); *A01K 85/1803* (2022.02); *A01K 85/1811* (2022.02); *A01K 85/1881* (2022.02)

(58) Field of Classification Search
CPC .... A01K 83/06; A01K 83/061; A01K 83/063; A01K 83/064; A01K 85/00; A01K 85/012; A01K 85/01; A01K 85/018; A01K 85/1803; A01K 85/1811; A01K 85/1813; A01K 85/1821; A01K 85/1881
USPC ........... 43/44.2, 44.4, 44.6, 44.8, 41, 42.06, 43/42.11, 42.15, 42.47, 42.24, 42.26, 43/42.28, 42.33
See application file for complete search history.

(56) References Cited

U.S. PATENT DOCUMENTS

| | | | |
|---|---|---|---|
| 489,110 A | 1/1893 | Welch | |
| 566,494 A | 3/1896 | Dales | |
| 573,572 A | 12/1896 | Dales | |
| 1,470,842 A | 10/1923 | Hyams | |
| 1,792,366 A * | 2/1931 | Ettles | A01K 85/18 43/42.34 |
| 1,813,722 A * | 7/1931 | Wright | A01K 85/16 43/42.34 |
| 2,089,605 A * | 8/1937 | Hardy | A01K 85/16 43/42.26 |
| 2,302,206 A * | 11/1942 | Gibson | A01K 83/06 43/41 |
| 2,334,792 A * | 11/1943 | Royston | A01K 85/18 43/42.34 |
| 2,467,971 A | 4/1949 | Frair | |
| 2,541,847 A | 2/1951 | Van Kirk | |
| 2,556,634 A | 6/1951 | Redinger | |
| 2,582,646 A | 1/1952 | Moore | |

(Continued)

FOREIGN PATENT DOCUMENTS

JP 2018191587 A * 12/2018
KR 20130001742 U * 3/2013

*Primary Examiner* — Darren W Ark
(74) *Attorney, Agent, or Firm* — Kenneth A. Roddy

(57) ABSTRACT

An articulated exoskeleton bait holder/protector and hook device for holding live or dead shrimp has a body formed of pivotally connected generally inverted U-shaped transverse body segments formed of stiff transparent plastic material defining interior cavities configured to receive the shrimps' head, abdominal segments, and telson. An arcuate eye opening extends over the front portion of the head segment. Retaining members extending through laterally opposed sides of the body segments releasably retain the shrimp in the interior thereof. A downwardly curved lip attached to the head segment causes the body to dive and oscillate from side to side as it is drawn through water. The body segments pivot to conform to natural movements of a live shrimp's abdominal segments as it moves forward or backward, and the open bottom portions of the body segments allow the scent of the shrimp to escape.

1 Claim, 4 Drawing Sheets

(56) References Cited

U.S. PATENT DOCUMENTS

| | | | | |
|---|---|---|---|---|
| 2,592,445 | A | | 4/1952 | McCarthy |
| 2,593,461 | A | * | 4/1952 | Jones ................... A01K 85/18 43/42.03 |
| 2,597,792 | A | * | 5/1952 | Hardy ................... A01K 85/18 43/42.26 |
| 2,663,964 | A | * | 12/1953 | Martin ................... A01K 85/18 446/368 |
| 2,724,205 | A | * | 11/1955 | Howard ................. A01K 85/16 43/42.3 |
| 2,740,224 | A | | 4/1956 | Heiderich |
| 2,770,063 | A | * | 11/1956 | Martin ................... A01K 85/16 43/42.26 |
| 2,791,859 | A | | 5/1957 | Wentworth |
| 2,819,553 | A | * | 1/1958 | Fultz ..................... A01K 85/16 43/42.49 |
| 2,828,571 | A | | 4/1958 | Caplan |
| 2,910,799 | A | * | 11/1959 | Wentworth ............ A01K 85/16 43/42.15 |
| 3,105,317 | A | * | 10/1963 | Fox ....................... A01K 85/16 43/42.3 |
| 3,377,734 | A | * | 4/1968 | Snow ..................... A01K 85/16 43/42.38 |
| 3,438,144 | A | * | 4/1969 | Lincoln ................. A01K 85/18 43/42.34 |
| 3,680,250 | A | * | 8/1972 | Hetrick ................. A01K 85/00 43/41.2 |
| 3,760,526 | A | * | 9/1973 | Hicks ..................... A01K 83/06 43/44.4 |
| 3,760,529 | A | * | 9/1973 | Hicks ..................... A01K 83/06 43/44.4 |
| 3,893,255 | A | * | 7/1975 | Hicks ..................... A01K 83/06 43/44.4 |
| 4,067,135 | A | * | 1/1978 | Martin ................... A01K 83/06 43/44.2 |
| 4,603,502 | A | * | 8/1986 | MacDonald ........... A01K 83/06 43/44.99 |
| 4,961,280 | A | * | 10/1990 | Hudson ................. A01K 83/06 43/44.99 |
| 5,787,634 | A | * | 8/1998 | Way ....................... A01K 85/18 43/42.26 |
| 5,915,944 | A | * | 6/1999 | Strunk ................... A01K 85/00 43/42.26 |
| 6,546,663 | B1 | * | 4/2003 | Signitzer ............... A01K 85/00 43/4.5 |
| 8,793,924 | B2 | * | 8/2014 | Hughes ................. A01K 85/18 43/42.26 |
| 11,129,373 | B2 | * | 9/2021 | Morris ................... A01K 85/18 |
| 2005/0072038 | A1 | * | 4/2005 | Daley ..................... A01K 83/06 43/44.4 |
| 2012/0102815 | A1 | * | 5/2012 | Hughes ................. A01K 85/18 43/42.26 |
| 2014/0250763 | A1 | * | 9/2014 | Hrncir ................... A01K 85/01 43/42.15 |
| 2015/0000178 | A1 | * | 1/2015 | Hamaguchi ........... A01K 85/00 43/42.53 |
| 2016/0157472 | A1 | * | 6/2016 | Neal ...................... A01K 85/18 43/41 |
| 2019/0082667 | A1 | * | 3/2019 | Gamache ............... A01K 85/01 |
| 2021/0076650 | A1 | * | 3/2021 | Bingham ............... A01K 85/18 |

\* cited by examiner

MORPHOLOGY COMMON SHRIMP

ARTICULATED EXOSKELETON BAIT HOLDER/PROTECTOR AND HOOK DEVICE

BACKGROUND OF THE INVENTION

1. Field of the Invention

This invention relates generally to fishing bait holders and protectors for protecting bait so as to conserve the bait for prolonged use and, more particularly, to an articulated exoskeleton bait holder/protector and hook device for holding live or dead shrimp bait which simulates the appearance and movements of live shrimp and protects the bait while fishing.

2. Background Art

As used herein, the following terms have the following meanings. The term "fishing lure" refers to a type of artificial fishing bait which uses movement, vibration, flash and/or color to attract the attention of larger fish. The term "live bait", as used herein, refers to a living marine animal such as a fish or crustacean used to entice larger prey. The term "exoskeleton" as used herein means a protective or supporting structure covering the outside of the body of an animal.

It is well recognized the most effective lure for most fishing, and in particular salt water fishing, is live bait. Although many brightly colored and shiny artificial fishing lure devices are employed to attract the fish from a distance, the most effective lure as the fish approaches is live bait. The movement, odor and appearance of live bait cannot be effectively duplicated by any synthetic means. Live bait is costly and under many fishing conditions, the live bait lives only a short time after which its effectiveness is greatly diminished. Further, it is unusual for the live bait to live through the strike of a game fish. Even if the game fish is caught, the live bait is usually destroyed in the process of bringing the fish to the boat or the shore. A number of devices have been provided and are employed to hold the live bait in position on the lure in proximity to hooks to engage the game fish. These devices either thread a hook or wire through the fish or in some way grip the fish to the lure. This process weakens the bait, kills it in a short time or still allows it to be mangled when the game fish strikes the lure.

Live shrimp are highly popular bait for fishing, and have almost become the all-purpose saltwater bait. Live shrimp when used as bait is an exceptionally effective way to attract fish. They can be used in almost any situation and typically result in catching fish, with many types of fish hitting on them. The live shrimp's movements and scent are strong fish attractants. One of the problems with using live shrimp as bait is that they need to be kept alive in a bait bucket, although fish have been known to hit on them even when they are dead. Another problem with using shrimp as bait is that many times smaller fish, that the person fishing is not necessarily attempting to catch, will nibble on them, leaving him or her with no shrimp or only a small part left on the hook. Thus, the supply of bait shrimp available can diminish very quickly and can be expensive to replenish.

Artificial Fishing Lures

Fishing lures differ from live bait in that the lure is an artificial fish attractant is designed to attract a fish's attention. Various lures use movement, vibration, flash and/or color to attract fish. There are several patents directed toward articulated artificial fishing lures, and artificial fishing lures that may be used in combination with attached live bait. Although the artificial lure will endure longer than live bait, and not likely be nibbled away, it is not as attractive as live or natural bait. There are many different structural arrangements of artificial bait. The following are several examples.

Ettles, U.S. Pat. No. 1,792,366 discloses an articulated artificial fish lure simulating the body of a shrimp. The lure is formed of a series of generally U-shaped arched body members and flexibly connected, head and tail portions, and depending members on the body, the depending members being fastened by means of the flexible connection between the body members. The lure body members are transparent. Ettles teaches that the transparent lure lends itself to the employment of colored rags adapted to be placed inside of the body of the lure to make it attractive to certain fish, or to fish in certain seasons.

Martin, U.S. Pat. Nos. 2,663,964 and 2,770,063, disclose artificial lures resembling a live shrimp which has a plurality of body segments the underside of which are secured to a fiat resilient spring member. An eyelet is secured to the head section of the body and a rigid actuator rod is secured by a loop to the eyelet, a forward extension of the rod carries a hook, and the rearwardly extending portion of the rod passes through an opening in the tail portion of the articulated body, and terminating in a second eyelet. The lure is designed to move backward by alternatively arching and straightening out the segmented body.

Similarly, Wentworth, U.S. Pat. No. 2,791,859, discloses an artificial lure resembling a shrimp which has a plurality of hinged body segments with a compression spring disposed on the underside of the lure and an actuating rod extending through the spring for imparting a rolling, skipping or yawing motion to the bait.

Way, U.S. Pat. No. 5,787,634 discloses an artificial saltwater fishing lure which imitates the sight, sound and movements of a live shrimp. The lure includes a body comprised of a plurality of interconnected "shell members", which include a head, a tail and intermediate members therebetween, a plurality of legs coupled with intermediate members of the body, a feeler coupled with the head of the body, and a pair of hooks are secured to bottom ends of the head and a tail of the body. The shell members of Way are not hollow. Instead, the head and tail are formed of solid material in a conical configuration, and the intermediate members are formed of solid material in a generally rectangular configuration each having forward, rearward, top, and bottom ends. A plurality of legs fabricated of feathers are connected to the bottom ends of the intermediate members, and a feeler fabricated of feathers is connected to the forward end of the head. The Way lure would be incapable of holding live or dead shrimp.

Live Bait Holders and Protectors

The concept of live bait holders and protectors wherein the bait can be "protected" while at the same time be displayed originated many years ago. Structures of this type are disclosed in Welch, U.S. Pat. No. 489,110; Dales, U.S. Pat. Nos. 556,494 and 573,572; Hyams, U.S. Pat. No. 1,470,842; Gibson et al, 2,302,206; Friar, U.S. Pat. No. 2,467,971; Van Kirk, U.S. Pat. No. 2,541,847; Redinger, U.S. Pat. No. 2,556,634; Moore, U.S. Pat. No. 2,582,646; McCarthy, U.S. Pat. No. 2,592,445; Heiderich, U.S. Pat. No. 2,740,224; and Caplan, U.S. Pat. No. 2,828,571.

My previous patent, U.S. Pat. No. 4,961,280, discloses a live bait protector and hook apparatus that includes a fishing hook and a line coupled to the hook. A transparent porous pouch having a plurality of openings formed throughout the surface thereof surrounds and encases the hook and live bait mounted on the hook. The pouch is also provided with a coupling or sealing member that allows the pouch to be opened and securely closed as required so that the bait can be protected from unwanted tampering while in the water.

Hicks, U.S. Pat. No. 3,760,526, discloses a holder for live shrimp or the like. Hicks teaches a single-piece generally tubular flexible transparent shell for receiving and gripping within it a live bait shrimp. The shell retains only the forward body portion of a shrimp (the head and thorax portion of the shrimp which are fused together to form the cephalothorax, which is covered by a hard thick shell called the "carapace"), and allows the tail, including all the abdominal segments of the shrimp to extend outwardly behind the shell in an uncovered condition to enable the shrimp to swim while its head is confined in the shell so that the shrimp is able to function normally and the shrimp can swim and otherwise move about in the water. There is a longitudinal slot along the bottom of the shell through which the shrimp legs protrude and a leg-passing fork hatch structure which is removably secured over the slot. The shank of a relatively large hook is fastened to the top of the shell and extends backwardly so that the arc of the hook extends behind the tail of the shrimp, permitting tail movement. At the forward end of the hook shank is an eyelet for fastening the holder to a fishing line. A problem with Hicks is that most of the bait animal is contained and visually distorted within an apparatus shell, and the rearwardly protruding hook is highly conspicuous. Game fish likely would be reluctant to approach such a contraption.

Hicks, U.S. Pat. Nos. 3,760,529 and 3,893,255, disclose holders for live bait fish, such as a minnow, which includes a flexible transparent shell defining a cavity sized and shaped to receive the forward body portion of the bait fish. The holder has opening at the rear portion of the shell for the insertion of the bait fish and protrusion of the tail of the bait fish so that the bait fish can swim. In the Hicks '529 Patent, openings are provided in the shell for the fins or other appendages. In the '255 Patent, internal, forwardly extending scale elements protrude inwardly from the shell adjacent its rear opening for inter-engagement with the scales of the bait fish to retain the bait fish in the shell. A hook is connected to the shell and is rotatable with respect to the shell so that its barb can be positioned in the cavity of the shell for storage and handling, or rotated to an outwardly protruding position when the holder is in use. The problems identified for the previous Hicks device are again presented.

SUMMARY OF THE INVENTION

The present invention overcomes the aforementioned problems and is distinguished over the prior art in general, and these patents in particular by an articulated exoskeleton bait holder/protector and hook device for holding live or dead shrimp. The device has a body formed of pivotally connected body segments including a head segment, a tail segment, and intermediate abdominal segments disposed therebetween, each formed of stiff transparent plastic material. An arcuate eye opening extends over the front portion of the head segment. The head segment has an interior cavity configured to receive the rostrum, carapace, and thorax, of a shrimp, an eyelet at a front end thereof. A fish hook is attached beneath the head segment and to the tail segment or an intermediate body segment. A curved lip, which may be removable, extends downwardly from the front portion of the head segment to cause the body to dive and to oscillate from side to side as it is drawn through water. Each of the intermediate abdominal segments has an inverted U-shaped transverse cross section with an open bottom portion defining an interior cavity configured to receive the abdominal segments of the shrimp, and the tail segment is configured to receive the telson of the shrimp. Retaining members received through laterally opposed sides of the body segments releasably retain the shrimp in the interior thereof. The body segments pivot to conform to natural movements of the shrimp's abdominal segments as it moves forward or backward, and the open bottom portions of the body segments allow the scent of the shrimp to escape. The sides of the body segments may also be provided with holes that allow the scent of the shrimp to escape.

One of the significant features and advantages of the present invention is that the articulated exoskeleton bait holder/protector and hook device is suitable for holding live or dead shrimp bait and protecting the bait from being nibbled on while fishing and leaving only a small part on the hook.

Another significant feature and advantage of this invention is that the articulated exoskeleton bait holder/protector and hook device simulates the appearance and movements of a live shrimp and protects the bait.

Another significant feature and advantage of this invention is that the articulated exoskeleton bait holder/protector and hook device has multiple body segments that pivot to conform to the natural movements of a live shrimp and, when holding a live shrimp, allows the shrimp to move its "walking legs" and "swimmerets" and to fan its uropods that flank the telson.

Another significant feature and advantage of this invention is that the articulated exoskeleton bait holder/protector and hook device, when holding a live shrimp, moves forward or backward with the shrimp, including the backward dart called the caridoid escape reaction when the shrimp becomes alarmed and flexes its tail fan in a rapid movement.

Another significant feature and advantage of this invention is that the articulated exoskeleton bait holder/protector and hook device has an eye opening that accommodates the stalked eyes of a live shrimp held therein to see its surroundings and thereby facilitate forward, backward, and escape movements of the protected shrimp responsive to its surroundings.

A further feature and advantage of this invention is that the articulated exoskeleton bait holder/protector and hook device has a substantially open bottom portion that allows fish to smell the bait which is a strong attractant and enhances the chance of a catch. The sides of the body segments may also be provided with holes that allow the scent of the shrimp to escape.

A still further feature and advantage of the present invention is that it is simple in construction, inexpensive to manufacture, and rugged and reliable in operation.

Other features and advantages of the invention will become apparent from time to time throughout the specification and claims as hereinafter related.

DETAILED DESCRIPTION OF THE INVENTION

Figure 1:
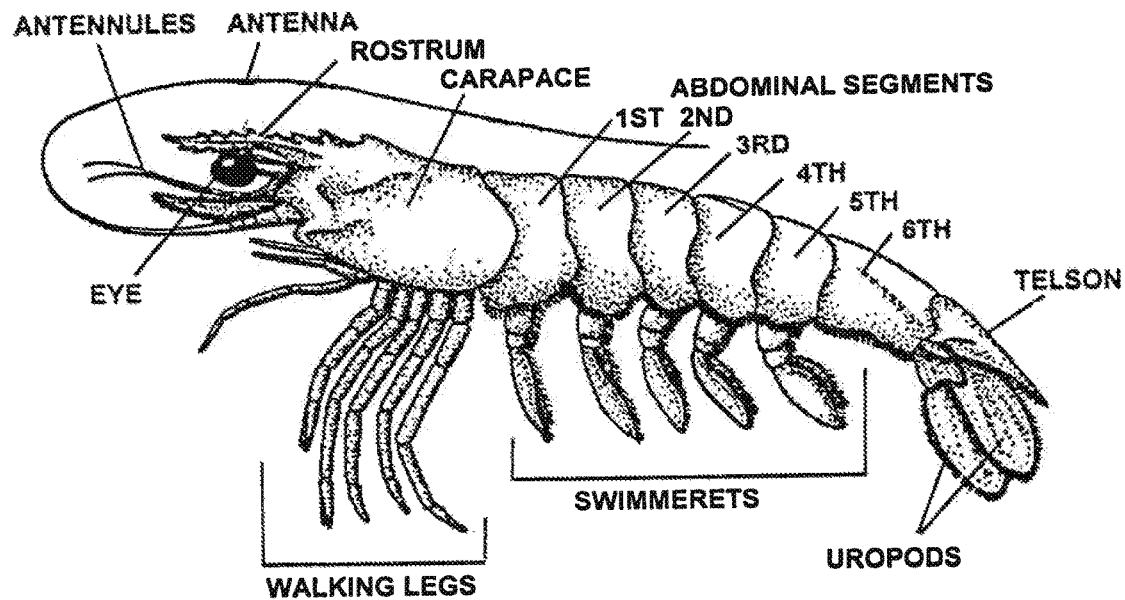
FIG. 1 is a side elevation view of the common shrimp showing the major body parts.
Figure 2:
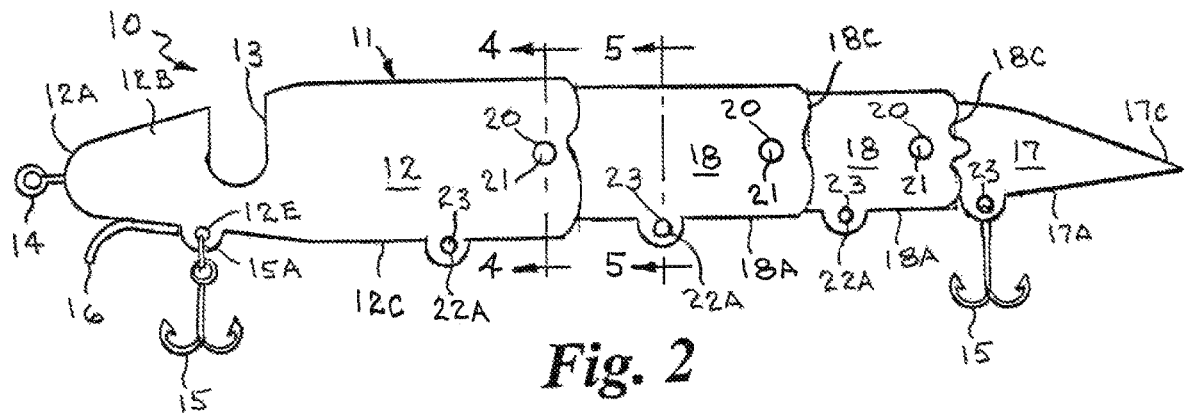
FIG. 2 is a side elevation view of a first embodiment of the articulated exoskeleton bait holder/protector and hook device, shown in a generally straight position.

In order to more clearly understand the present invention, a brief description of the morphology of a common shrimp is presented with reference to FIG. 1. The shrimp (like crabs, lobsters, and crayfish) is a small marine decapod crustacean. As with other crustaceans, the body is covered with a smooth jointed exoskeleton made of the protein chitin and calcium that must be periodically shed and re-formed as the animal grows. However, the shrimp's exoskeleton tends to be thinner than that of most other crustaceans; it is grayish and almost transparent. The common shrimp has three distinct body parts: the head or "carapace", the thorax, and the abdomen which are broken down into additional major parts. As shown in FIG. 1, the "rostrom" protrudes from the front top center of the head or "carapace", the abdomen includes six abdominal segments (the first just behind the carapace and the sixth in front of the tail), and the tail or "telson" that extends from the sixth abdominal segment. The muscular abdomen has a thinner shell than the carapace. Each segment has a separate overlapping shell. The eyes are set on the tips of stalks located on either side of the rostrum. Shrimp have five pairs of jointed legs on the thorax (also referred to as "walking legs"), and five pairs of swimming legs or "swimmerets" on the abdomen and the tail or "telson" which are used, along with the tail, when swimming. The telson is flanked by two pairs of appendages called the "uropods". The uropods allow the shrimp to swim backwards, and function like rudders, steering the shrimp when it swims forward. Together, the telson and uropods form a splayed tail fan. If a shrimp is alarmed, it can flex its tail fan in a rapid movement which results in a backward dart called the caridoid escape reaction.

Figure 3A:
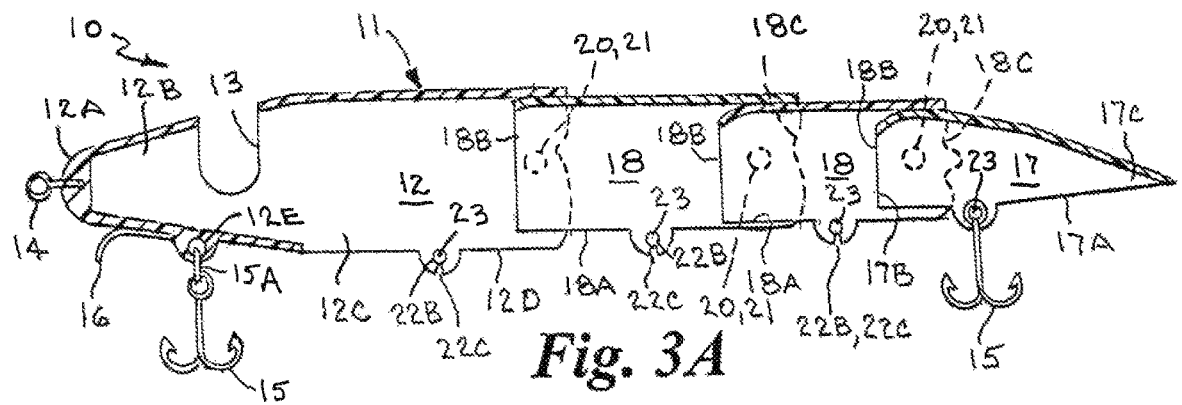
FIGS. 3A and 3B are longitudinal cross sectional views of the articulated exoskeleton bait holder/protector and hook device of FIG. 1, shown in a generally straight position and a generally curved position, respectively.
Figure 3B:
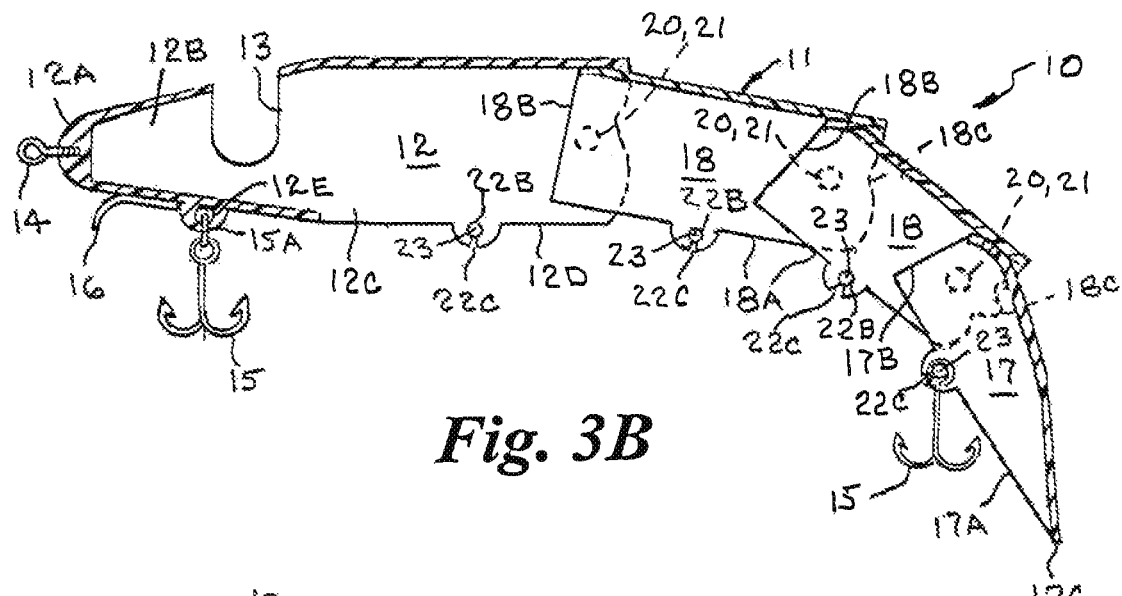

Referring now to the drawings by numerals of reference, there is shown in FIGS. 2, 3A, 3B, 4, 5A, 5B, and 5C, an articulated exoskeleton bait holder/protector and hook device 10 in accordance with a first embodiment the present invention. FIGS. 3A and 3B show the articulated exoskeleton bait holder/protector and hook device 10 in a generally straight position and a generally curved position, respectively.

The articulated exoskeleton bait holder/protector and hook device 10 includes a body 11 formed by a plurality of pivotally interconnected body segments having an inverted generally U-shaped transverse cross section. The interconnected body segments include a head segment 12, a tail segment 17 and intermediate abdominal segments 18 extending therebetween. In a preferred embodiment, the interconnected body segments are formed of a transparent plastic material, however, other materials may be used.

The head segment 12 is enclosed at the front end 12A defining a generally conical front portion 12B and has an inverted U-shaped rear portion 12C with an open bottom end 12D extending rearwardly therefrom. An arcuate aperture or eye opening 13 extends over the front portion 12B and terminates on laterally opposed sides thereof. The interior of the conical front portion 12B of the head segment 12 is configured to receive the rostrum, carapace, and thorax, of a shrimp. The eye opening 13 is configured to allow the eyes of the shrimp which are set on the tips of stalks located on either side of the rostrum to protrude therethrough. The open bottom end 12D of the head segment 12 allows the forward jointed legs or "walking legs" of the thorax of the shrimp to extend outwardly from the head segment. The rear end of the laterally opposed sides of the head segment 12 may be curved or contoured to resemble the natural shape of the carapace of a real shrimp. The front end 12A of the head segment 12 has an eyelet 14 extending forwardly therefrom to allow for the attachment of a fishing line thereto. A fish hook 15 is attached by a ring 15A to an aperture 12E at the bottom of the generally conical front portion 12B of the head segment 12. A curved lip 16 mounted on the bottom of the generally conical front portion 12B of the head segment 12 extends downwardly therefrom near the front end thereof. The curved lip 16 causes the bait holder/protector and hook device 10 to dive and to oscillate from side to side as it is drawn through the water.

Figure 3C:
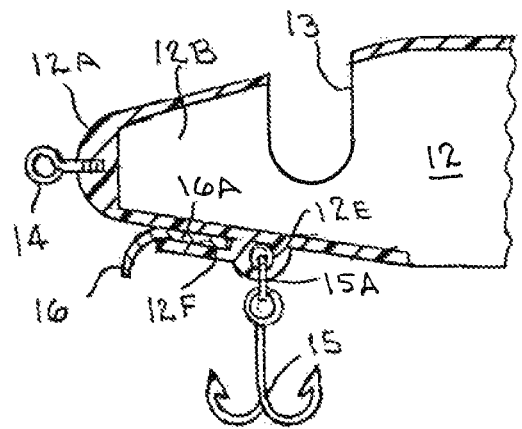
FIG. 3C is a longitudinal cross sectional view through the front portion of the head segment showing a modification wherein the curved lip member is removably mounted in a slot in the bottom of the head segment.

Alternatively, as shown in FIG. 3C, the bottom of the conical front portion 12B of the head segment 12 may be provided with a longitudinal rearward extending slot 12F configured to removably receive and frictionally engage the shank portion 16A of the curved lip 16 member when pressed into the slot, and allow it to be removed therefrom by pulling it forwardly outward of the slot. Removal of the curved lip 16 facilitates forward, backward, and escape movements of the protected shrimp responsive to its surroundings.

The tail segment 17 has an inverted generally U-shaped transverse cross section with an open bottom end 17A, a front end 17B, and a rear end 17C. The laterally opposed sides of the tail segment 17 taper slightly inward and downwardly from the front end 17B to resemble the natural shape of the tail or "telson" that extends from the sixth abdominal segment of the shrimp, and defines an interior configured to receive the tail or "telson" of the shrimp.

Each of the intermediate abdominal segments 18 has an inverted generally U-shaped transverse cross section with an open bottom end 18A, a front end 18B, and a rear end 18C. The rear end 18C of the laterally opposed sides of the intermediate abdominal segments 18 may be curved or contoured to resemble the natural shape of the abdominal segments of a real shrimp. In the illustrated example, only the rear end is shown contoured, however, it should be understood that the front end 18B may also be contoured. The interconnected intermediate abdominal segments 18 define an interior configured to receive the abdominal segments of a real shrimp. In the illustrated example, the rear portion of the head segment 12 is of a length to encompass the first abdominal segment of the shrimp, the first abdominal segment 18 behind the head segment is of a length to encompass the second and third abdominal segment of the shrimp, the second rearward abdominal segment 18 is of a length to encompass the fourth and fifth abdominal segment of the shrimp, and the tail segment 17 is of a length to encompass the sixth abdominal segment and telson of the shrimp. The intermediate abdominal segments 18 are pivotally connected (described hereinafter) to pivot between a generally straight configuration and a generally curved arcuate configuration.

In the illustrated example, only several intermediate abdominal segments 18 are shown, however, it should be understood that the articulated exoskeleton bait holder/ protector and hook device 10 may be provided with any number of intermediate abdominal segments 18 of different lengths.

Figure 4:
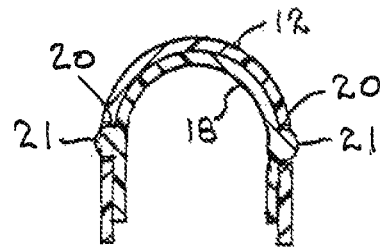
FIG. 4 is a transverse cross sectional view through one of the articulating exoskeleton segments, taken along line 4-4 of FIG. 1, showing the pivot connection.

As described above, the rear portion of the head segment 12, each of the intermediate abdominal segments 18 and the tail segment 17 has an inverted generally U-shaped transverse cross section with an open bottom end. As best seen in FIG. 4, each of the laterally opposed sides of the head segment 12, and the intermediate abdominal segments 18 have an aperture 20 extending therethrough in axial alignment closely adjacent to the rear end thereof. Each of the intermediate abdominal segments 18 and the tail segment 17 has a short protrusion 21 extending outwardly from each of its laterally opposed sides closely adjacent to the front end thereof.

The widths of the inverted generally U-shaped rear portion 12C of the head segment 12, each of the intermediate abdominal segments 18, and the tail segment 17 are sequentially smaller from the head segment to the tail segment. The front end of the forwardmost abdominal segment 18 is slidably received in the rear portion 12C of the head segment 12 and its protrusions 21 snap fit into the apertures 20 of the head segment to form a pivot connection. Similarly, the front end of the second abdominal segment 18 is slidably received in the rear portion of the forwardmost abdominal segment and its protrusions 21 snap fit into the apertures 20 of the forwardmost abdominal segment to form a pivot connection. The front end of the subsequent abdominal segments 18 are slidably received in the rear portion of the preceding connected abdominal segments and their protrusions 21 snap fit into the apertures 20 of the preceding abdominal segment to form pivot connections. The front end of the tail segment 17 is slidably received in the rear portion of the rearmost abdominal segment 18 and its protrusions 21 snap fit into the apertures 20 of the rearmost abdominal segment to form a pivot connection.

The apertures 20 and protrusions 21 forming the pivot connections are located to allow the abdominal segments 18 and the tail segment 17 to be pivoted a distance downwardly until the front top front end of the inner segment engages the underside of the inverted U-shaped outer segment. This allows the articulated exoskeleton bait holder/protector and hook device 10 to articulate between a generally straight configuration and a generally curved arcuate configuration without forming a gap at the top of the device.

Figure 5A:
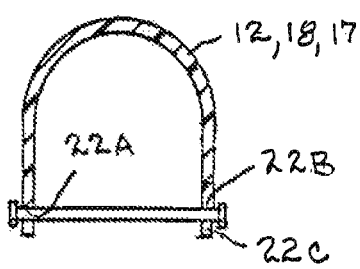
FIG. 5A is a transverse cross sectional view through one of the articulating exoskeleton segments, taken along line 5-5 of FIG. 1, showing the transverse retaining rod extending through both sides of the U-shaped segment.
Figure 5B:
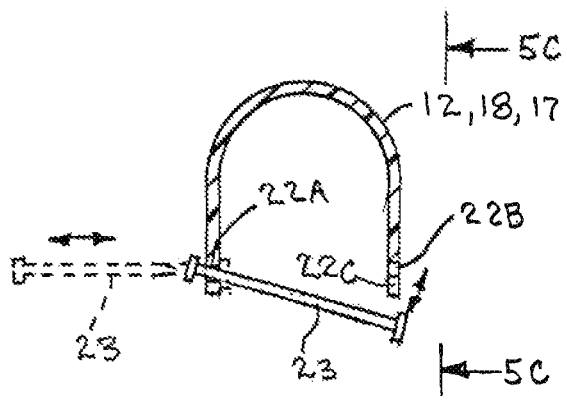
FIG. 5B is a transverse cross sectional view through one of the articulating exoskeleton segments, similar to FIG. 5A, showing the transverse retaining rod extending through one side of the U-shaped segment and being inserted into the slot and hole in the opposed side of the segment.
Figure 5C:
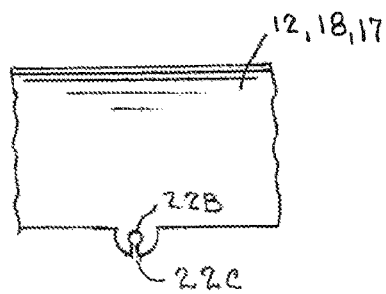
FIG. 5C is a side elevation view of exterior of the articulating exoskeleton segment taken along line 5C-5C of FIG. 5B, showing the slot and hole in the side of the segment.

As best seen in FIGS. 5A, 5B and 5C, the rear portion of the head segment 12, the intermediate abdominal segments 18, and the tail segment 17 each have a small hole 22A and 22B extending through respective laterally opposed sides of their inverted U-shaped portion in axial alignment closely adjacent to the bottom end thereof. The hole 22A on one side is completely circular, and the laterally opposed hole 22B has an adjoining small vertical slot 22C extending to the bottom of the side wall. A retaining rod 23 having a head at each end is slidably received through the completely circular hole 22A on one side of the inverted U-shaped portion of the body segment, and is installed in the laterally opposed hole 22B by pressing it upwardly into the vertical slot 22C to snap fit into the laterally opposed hole. When installed, the retaining rods 23 extend transversely across the open bottom of the inverted U-shaped portions of the head segment 12, the intermediate abdominal segments 18, and the tail segment 17. The retaining rod 23 extending transversely through the tail segment 17 may be passed through the eyelet of a fish hook 15 to support the fish hook from the tail segment, or the fish hook 15 may be attached by a ring to any of the retaining rods 23 at the bottom of the abdominal segments 18.

Figure 5D:
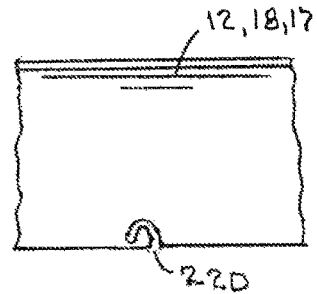
FIG. 5D is a side elevation view similar to FIG. 5C, showing an alternate J-slot arrangement on one side of the U-shaped segment for releasably retaining the free end of the transverse retaining rod.

Alternatively, as shown in FIG. 5D, one side of the U-shaped segments 18 and 17 may be provided with a J-slot 22D for releasably retaining the free end of the transverse retaining rod 23. In this modification, the free end of the retaining rod 23 is moved upwardly into the open end of the J-slot 22C and then downwardly into the closed portion of the slot.

Referring now to FIGS. 7, 8A, 8B, and 9, there is shown an alternate embodiment of the articulated exoskeleton bait holder/protector and hook device 10A, which utilizes a pivot connection at the top of the body segments rather that at the sides. The components that are the same or similar to those shown and described in detail in the previous embodiment are assigned the same numerals of reference, but some of the components will not be described again in detail to avoid repetition.

For purposes of illustration, the body segments are shown with the vertical slot 22C and hole 22B snap fit arrangement on one side for retaining the retaining rods 23, however, it should be understood that they may be provided with the J-slot 22D arrangement as shown in FIG. 5D, and described previously. It should also be understood that the head segment 12 this embodiment may be provided with the longitudinal rearward extending slot 12F and removable curved lip 16, as shown in FIG. 3C, and described previously.

As with the previous embodiment, the articulated exoskeleton bait holder/protector and hook device 10A includes a body 11 formed by a plurality of pivotally interconnected body segments including the head segment 12, the tail segment 17 and the intermediate abdominal segments 18, as described in detail previously.

In this embodiment, the top of the head segment 12 and each of the intermediate abdominal segments 18 has a short raised protrusion 25 at the rearward end thereof with a central vertical slot 25A formed therethrough. The forward end of the tail segment 17 and each of the intermediate abdominal segments 18 has a short raised protrusion 26 at the forward end thereof. The raised protrusions 26 at the forward end of the body segments are slidably received in the slots 25A of the protrusions 25 at the rearward end, and are pivotally connected by respective pivot pins 27 extending through axially aligned transverse holes in the rearward end and forward end protrusions.

Holding Shrimp Inside Either Embodiment

The following procedure may be used to place a live or dead shrimp inside the articulated exoskeleton bait holder/protector and hook device 10 or 10A. The articulated exoskeleton bait holder/protector and hook device 10 or 10A is placed upside down on a flat surface. As shown in FIG. 5B, one end of the retaining rods 23 are unsnapped from the holes 22B and vertical slots 22C on one side of the body segments and the opposed end of the retaining rods are pulled a distance outwardly such that the interior of the body segments are substantially unobstructed, as shown in dashed line. A live or dead shrimp is placed with its backside downward into the interior of the body segments and slid forwardly such that its the rostrum, carapace, and thorax, are received in the generally conical interior front portion 12B of the head segment 12 and its eyes protrude through the arcuate eye opening 13. The body and tail of the shrimp may be pressed into the interior of the U-shaped abdominal body segments and tail segment to conform thereto. The retaining rods 23 are then pushed back toward the opposite side and pressed through the vertical slot 22C to snap fit into the hole 22B, or placed into the J-slot 22D, as described previously.

Figure 6:
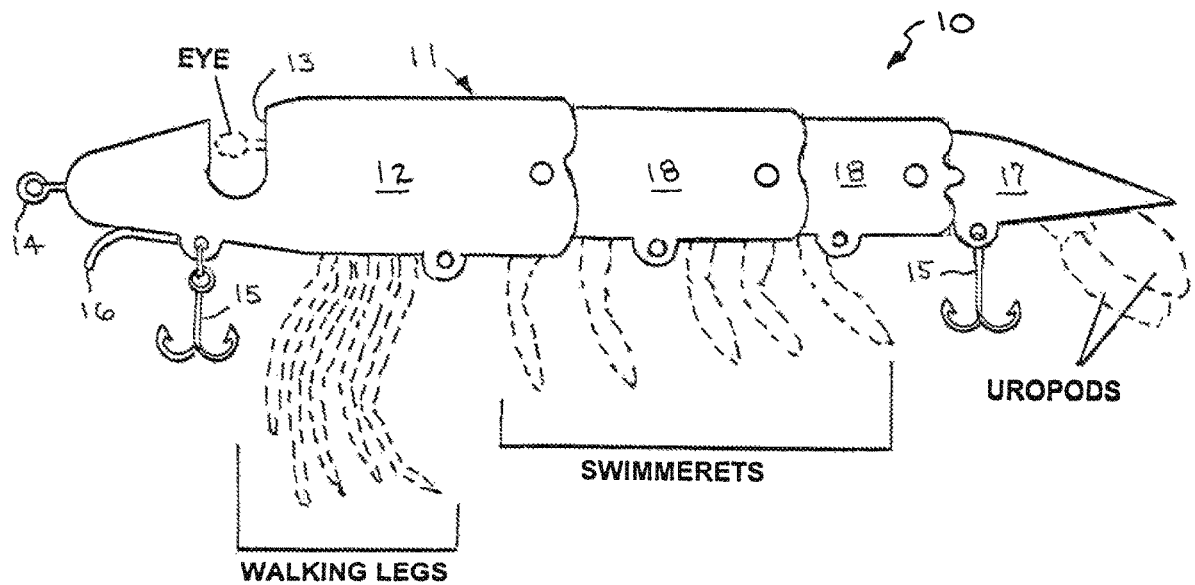
FIG. 6 is a side elevation view of the articulated exoskeleton bait holder/protector and hook device, shown in use, with the eyes, walking legs, swimmerets, and uropods of the shrimp shown in dashed line.
Figure 7:
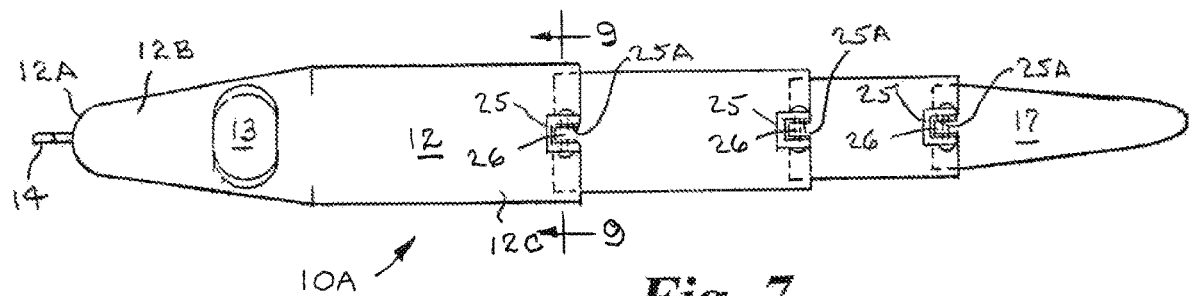
FIG. 7 is a top plan view of the articulated exoskeleton bait holder/protector and hook device in accordance with a second embodiment of the present invention having an alternate pivot connection, shown in a generally straight position.
Figure 8A:
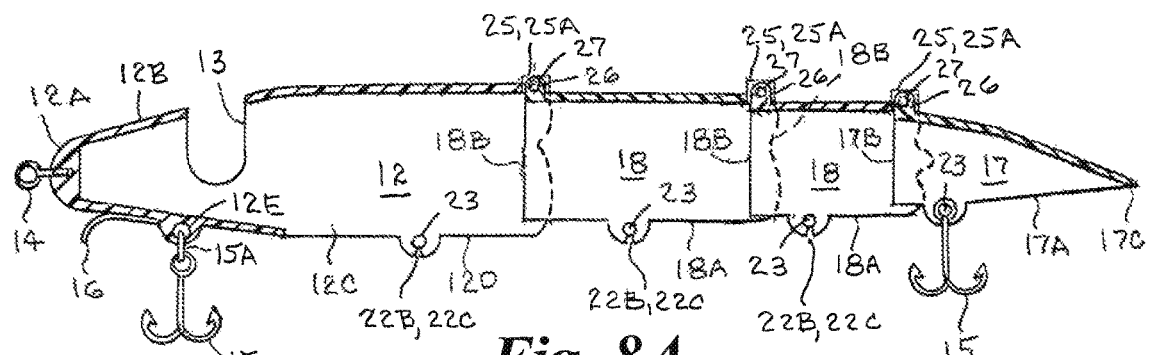
FIGS. 8A and 8B are longitudinal cross sectional views of the articulated exoskeleton bait holder/protector and hook device of FIG. 7, shown in a generally straight position and a generally curved position, respectively.
Figure 8B:
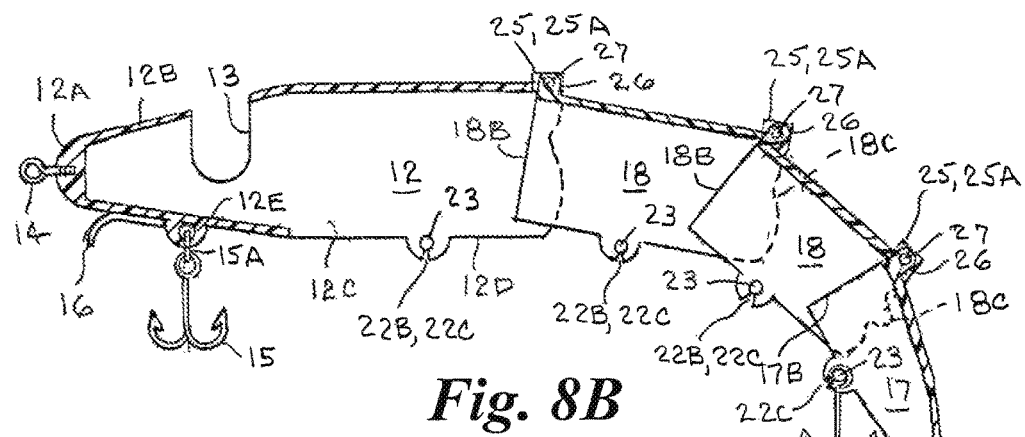
Figure 9:
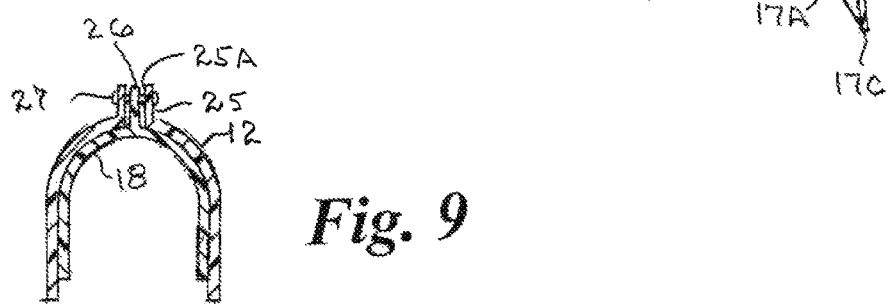
FIG. 9 is a transverse cross sectional view through one of the articulating exoskeleton segments, taken along line 9-9 of FIG. 7, showing the pivot connection.

Referring again to FIG. 6, when a live shrimp is installed in the articulated exoskeleton bait holder/protector and hook device 10 or 10A, the retaining rods 23 extend transversely beneath the shrimp's thorax and between the jointed legs or "walking legs" of the thorax; transversely beneath the shrimp's abdominal segments and the swimming legs or "swimmerets" on the abdomen; and transversely beneath the shrimp's tail or "telson". Thus, the articulated exoskeleton bait holder/protector and hook device 10 allows the shrimp to move its "walking legs" and "swimmerets" and to fan its "uropods" that flank the telson. The articulated exoskeleton bait holder/protector and hook device 10 or 10A also pivots to conform to the natural movements of the shrimp's abdominal segments between a generally straight configuration and a generally curved arcuate configuration. The articulated exoskeleton bait holder/protector and hook device 10 or 10A moves forward or backward with the shrimp, including the backward dart called the caridoid escape reaction when the shrimp becomes alarmed and flexes its tail fan in a rapid movement. The eye opening 13 allows a live shrimp held therein to see its surroundings and thereby facilitate forward, backward, and escape movements of the protected shrimp responsive to its surroundings.

The substantially open bottom portion of the of the articulated exoskeleton bait holder/protector and hook device 10 or 10A allows fish to smell the bait just as if it were not in the exoskeleton, which is a strong attractant and enhances the chance of a catch. The side walls of the head segment 12 and the intermediate abdominal segments 18 may also be provided with holes (not shown) to allow the scent of the shrimp to escape. However, because the exoskeleton covers the bait and is disposed over the hooks the fish or other predators cannot nibble on or destroy the bait.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An articulated exoskeleton bait holder/protector and hook device for holding live or dead shrimp which simulates the appearance and movements of a shrimp comprising:

a segmented body formed of pivotally connected body segments including a head segment, a tail segment, and a plurality of intermediate abdominal segments disposed therebetween, each of said body segments formed of a stiff transparent plastic material and having a forward end, a rearward end, a top end, and a bottom end;

said head segment having a generally conical front portion with the forward end being an enclosed front end defining a hollow interior cavity with a rear portion having an inverted U-shaped transverse cross section with lateral side walls and an open bottom portion extending rearwardly therefrom to the rearward end, and an arcuate eye opening adjacent to said enclosed front end extending through and across said conical front portion and terminating on laterally opposed sides thereof, said head segment hollow interior cavity configured to receive a rostrum, carapace, and thorax of the shrimp, and said eye opening in communication with said head segment hollow interior cavity to allow eyes of the shrimp to protrude therethrough;

an eyelet secured to said enclosed front end of said generally conical front portion of said head segment for receiving a fishing line;

a fish hook suspended beneath said generally conical front portion of said head segment;

a curved lip removably attached to said head segment near said enclosed front end extending forward and downwardly from an underside thereof configured to cause said segmented body to dive and to oscillate from side to side as it is drawn through water;

each of said intermediate abdominal segments having an inverted U-shaped transverse cross section with lateral side walls and an open bottom portion defining a hollow interior cavity configured to receive abdominal segments of the shrimp, and said tail segment having an inverted U-shaped transverse cross section with lateral side walls and an open bottom portion defining a hollow interior cavity configured to receive a telson of the shrimp;

said inverted U-shaped cross section of said rear portion of said head segment, said inverted U-shaped cross sections of said intermediate abdominal segments, and said inverted U-shaped cross section of tail segment having respective widths that are sequentially smaller from said head segment to said tail segment;

a front portion of a forwardmost one of said abdominal segments slidably received in said rear portion of said head segment hollow interior cavity, a front portion of a second one of said abdominal segments slidably received in a rear portion of said hollow interior cavity of said forwardmost one of said abdominal segments, and a front portion of said tail segment slidably received in a rear portion of said hollow interior cavity of said second one of said abdominal segments;

respective pivot connections connecting said rear portion of said head segment and said front portion of said forwardmost one of said abdominal segments, connecting said rear portion of said forwardmost one of said abdominal segments portions and said front portion of said second one of said abdominal segments, and connecting said rear portion of said second one of said abdominal segments and said front portion of said tail segment, said pivot connections configured to allow said segmented body to articulate between a generally straight configuration and a generally curved arcuate configuration; and retaining rod members extending transversely and horizontally across said open bottom portion between said lateral side walls of said head segment rear portion, said lateral side walls of said intermediate abdominal segments, and said lateral side walls of said tail segment to releasably retain the rostrum, carapace, thorax, abdominal segments, and telson of the shrimp in said hollow interior cavities when the shrimp is received therein;

said segmented body substantially covering and protecting the rostrum, carapace, thorax, abdominal segments, and telson of the shrimp when the shrimp is received therein, said pivot connections providing relative pivotal movement between said head segment, each of said intermediate abdominal segments, and said tail segment to conform to natural movements of a live shrimp's abdominal segments as it moves forward or backward, and said open bottom portion of said body segments allowing the scent of the shrimp to escape.

* * * * *